US008499719B2

(12) United States Patent  (10) Patent No.: US 8,499,719 B2
Brocca et al.  (45) Date of Patent: Aug. 6, 2013

(54) AUTOMATED SYSTEM FOR CONTROLLED DISTRIBUTION OF SUBSTANCES TO ANIMAL CONTAINMENT DEVICES IN AN ANIMAL HOUSING FACILITY

(75) Inventors: Marco Brocca, Tradate (IT); Giovanni Frangelli, Caronno Varesino (IT)

(73) Assignee: Tecniplast S.p.A., Buguggiate (IT)

( * ) Notice: Subject to any disclaimer, the term of this patent is extended or adjusted under 35 U.S.C. 154(b) by 379 days.

(21) Appl. No.: 12/815,995

(22) Filed: Jun. 15, 2010

(65) Prior Publication Data

US 2010/0313813 A1  Dec. 16, 2010

(30) Foreign Application Priority Data

Jun. 16, 2009  (EP) ..................... 09425232

(51) Int. Cl.
*A01K 5/02* (2006.01)
(52) U.S. Cl.
USPC .......... 119/57.92; 119/72.5; 119/457
(58) Field of Classification Search
USPC ........... 119/56.1, 56.2, 57, 57.5, 57.6, 57.92, 119/57.1, 72.5, 81, 224, 416, 417, 418, 419, 119/420, 421, 457; 222/650; 141/83, 192
See application file for complete search history.

(56) References Cited

U.S. PATENT DOCUMENTS

| 3,022,767 | A |   | 2/1962  | Malek |
| 3,074,375 | A | * | 1/1963  | Finkel ........................ 119/417 |
| 3,664,302 | A | * | 5/1972  | Wienert ....................... 119/457 |
| 3,840,131 | A | * | 10/1974 | Castaldi ....................... 414/281 |
| 4,248,563 | A | * | 2/1981  | Fur ............................. 414/280 |
| 4,450,668 | A | * | 5/1984  | Grossi .......................... 53/176 |
| 4,546,901 | A | * | 10/1985 | Buttarazzi ..................... 221/10 |
| 4,756,657 | A | * | 7/1988  | Kinney ........................ 414/281 |
| 4,811,675 | A | * | 3/1989  | Segalla ....................... 119/57.6 |
| 4,812,629 | A | * | 3/1989  | O'Neil et al. ................ 235/383 |
| 5,139,384 | A | * | 8/1992  | Tuttobene .................... 414/281 |
| 5,499,707 | A | * | 3/1996  | Steury ......................... 194/217 |
| 6,280,135 | B1| * | 8/2001  | Cunningham ............... 414/280 |
| 6,597,970 | B1| * | 7/2003  | Steury et al. ................. 700/242 |
| 7,320,294 | B2| * | 1/2008  | Irwin et al. .................. 119/455 |
| 7,882,680 | B2| * | 2/2011  | Siegel et al. .................... 53/55 |
| 8,219,243 | B2| * | 7/2012  | Haas ........................... 700/216 |

FOREIGN PATENT DOCUMENTS

| CA | 1237348    | 5/1988  |
| DE | 102006053194 | 5/2008 |
| EP | 0677245    | 10/1995 |
| FR | 2844145    | 3/2004  |
| JP | 4121129    | 4/1992  |
| WO | 2008097080 | 8/2008  |
| WO | 2009072982 | 6/2009  |

\* cited by examiner

*Primary Examiner* — Rob Swiatek
*Assistant Examiner* — Ebony Evans
(74) *Attorney, Agent, or Firm* — LeClairRyan, a Professional Corporation (57) ABSTRACT

An automated system for the distribution of substances to animal containment devices in an animal housing facility. The present invention also relates to a dosing device of substances, such as solid or liquid feed, which is part of said system, and to the method for dispensing feed implemented by said system. Furthermore, the present invention also relates to a method for automated dispensing of substances to animal containment devices in an animal housing facility.

8 Claims, 9 Drawing Sheets

AUTOMATED SYSTEM FOR CONTROLLED DISTRIBUTION OF SUBSTANCES TO ANIMAL CONTAINMENT DEVICES IN AN ANIMAL HOUSING FACILITY

CROSS-REFERENCE TO RELATED APPLICATIONS

This application claims priority from European Patent Application No. 09425232.7, filed on Jun. 16, 2009, which application is incorporated herein by reference in its entirety.

FIELD OF THE INVENTION

The present invention relates to an automated system for controlled distribution of substances to animal containment devices in an animal housing facility. In particular, the system according to the present invention is particularly suitable to solve problems related to dispensing feed to laboratory animals used for scientific experiments. Even more in particular, the present invention relates to an automated system for controlled distribution of feed, or diet, to tanks containing fish or similar aquatic animals.

The present invention also relates to a device for dosing substances, such as solid or liquid feed, belonging to said system, and to the method for dispensing feed implemented by said system.

BACKGROUND OF THE INVENTION

As it is known, some species of fish, such as the *Danio rerio*, commonly known as zebrafish, are assuming an increasingly important role in scientific research laboratories. These fish have proved to be excellent indicators both for basic research studies and for pharmaceutical research studies, with application to developmental biology, embryology, toxicology, to the study of hereditary human diseases.

These fish, just as other fish or other animals in general, used for scientific experiments in various fields of biology which can range from biochemistry to behavioural biology, must naturally be raised and maintained in environmental conditions that are as stable and controlled as possible.

One of the various parameters that must be constantly monitored, is a natural diet, i.e., feeding.

In fact, it is known not only that food has a direct influence on the organism of the animal, but also that food is a highly polluting agent for the environment in which the animals live, particularly in the case of aquatic animals such as fish. When too much food is dispensed and is therefore not completely eaten by the fish, it rapidly pollutes the water, drastically deteriorating the quality, which naturally has a negative effect on the state of health of the fish.

Similarly, when excessive quantities of food are eaten by the fish, the water is polluted as a result of the excrement produced by the fish.

For these and other reasons well known in the sector and which shall not be listed in detail herein, controlling the food of animals, and in particular of fish, used in the laboratory for scientific experiments is an aspect of primary importance in order to guarantee appropriate scientific research.

It is also known that animal housing facilities destined to contain laboratory animals house a large quantity of animals. In the case of fish these animal housing facilities can occupy very large rooms in which there are thousands of tanks, each containing one or more fish, even ten or more fish for each tank. (Normally the maximum density commonly accepted is of 10 fish/l).

It is therefore evident how dispensing of food to the animals housed in the animal housing facility is an activity that requires a great deal of time, which translates into high cost when this activity is performed manually by an operator or by a laboratory technician. Therefore, manual dispensing of the diet to the animals housed in the animal housing facility has numerous disadvantages.

As stated, the activity increases in terms of time and expense in proportion to the increase in the number of animals housed in the animal housing facility. Moreover, it is clear how dispensing of the diet by an operator introduces a margin of uncertainty regarding the quantity of food dispensed while, as stated, controlling the quantity of food dispensed to each animal is a fundamental aspect of the scientific experimentation activities to which said animals are subjected and for the quality of life thereof.

Furthermore, it is known that for fish used in aquaculture environments it is always advisable to dispense a given quantity of food in several rations during the day than a single dose of the same quantity. Therefore, the fish are normally fed from two to four times a day, with quantities of food that vary indicatively in a range limited to a few milligrams per fish, in the case of zebrafish.

Therefore, it is even more apparent that the drawbacks indicated above are even greater when considering that, in the case of fish used as experimental models, food is dispensed several times a day. Above all in the case of animal housing facilities comprising a large number of tanks, dispensing of food can therefore become an activity that occupies the researcher or laboratory technician for a considerably part of his time, and that this time is therefore taken away from the actual research activity.

Moreover, as stated, there may be several fish present in each tank. Therefore, another task entrusted to the operator is to establish each time the quantities of food to dispense to each tank according to the number of fish it contains. Also in this case, besides introducing the possibility of an error in defining the quantity of food, a considerable amount of time is required by an operator to determine and continuously check the quantities dispensed.

To provide an example, it has been found to be preferable to dispense food three times a day, once in the morning, once at midday and once in the afternoon, and obviously food must also be dispensed at the weekend. To date, where distribution of the diet is managed manually, there is a tendency to reduce dispensing during the weekend to only once a day to avoid burdening personnel with excessive work, which naturally translates into a cost for dedicated personnel. Moreover, it is apparent how dispensing food only once a day is not an optimum choice for the well-being of the animals, not only due to the fact that this introduces a variation in the diet which in any case reflects on the animals, but also because dispensing food only once a day usually implies that this ration is more abundant. Due to the morphology of the fish, which cannot eat food that deposits on the bottom, all food that is not assimilated immediately by the animals when it is a suspension in water, remains on the bottom of the tank causing the water to deteriorate in quality. Many species of fish, including zebrafish, due to their physical structure find it difficult to consume food once it has deposited at the bottom of the tank. In fact, these animals feed in the surface layers of the water column in which they live and have a "superior" mouth type. To provide another example of the extent of the problem, the time that the operator dedicates to the activity of dispensing food amounts to a cost of several thousands of euro per year for each structure or rack containing tens of tanks for housing fish.

A further problem linked in particular to the dispensing of food to aquatic organisms raised in specific tanks and which to date has prevented the production of automated systems for dispensing the diet, particularly solid diet, is linked to the environmental conditions found in the animal housing facility. In fact, it is known that the temperature and ambient humidity conditions in housing facilities for aquatic organisms have a negative influence on the feed. As the water inside the tanks is maintained at a temperature of around 27-28° C., the ambient temperature is normally around 25° C., with a humidity that can even reach values of 70%.

In these conditions, the feed forming the solid diet tends to become compacted, as it absorbs the humidity in the air, in practice making it necessary for the operator to distribute the feed by hand with particular measures.

A negative aspect worthy of notice is represented by the high probability of spilling the diet outside the specific holes. The result is that of obtaining large quantities of organic material which act as a substrate for the growth of undesirable organisms such as moulds, bacteria and insects. Often, this problem is sufficient for inspection bodies to refuse to issue the certificates required for the good management of an animal housing facility (e.g., IACUC in the USA).

Finally, but of no less importance, the discomforts to which researchers and laboratory technicians (animal technologists) are subjected while dispensing food to the tanks and therefore to the animals must also be mentioned, caused by the fact that structures have not been designed with attention to ergonomics. In fact, the structures supporting the tanks (racks) are often over 2 meters in height. Therefore, stools are often used in order to reach the tanks positioned on the top rows, resulting in a high risk of falls. The larger the dimension of the animal housing facility is, the greater the discomfort caused will be.

BRIEF SUMMARY OF THE INVENTION

The main aim of the present invention is therefore to provide an automated system for dispensing substances, such as food, to animals in an animal housing facility, which overcomes the aforesaid drawbacks.

Within this aim, an object of the present invention is to provide an automated system for dispensing food in an animal housing facility capable of performing said dispensing in an automated manner, thereby eliminating the need for direct action by the operator, which translates into a considerable saving of time and costs and ergonomic and health and hygiene benefits.

A further aim of the present invention is also to provide an automated system for dispensing substances in an animal housing facility of the type comprising a plurality of animal containment devices, such as aquaculture tanks, which is capable of dispensing a controlled and predetermined quantity of said substance, for example food, for each animal containment device of the animal housing facility.

Another aim of the present invention is to provide an automated system for dispensing substances to animal containment devices in an animal housing facility which allows dispensing of both solid and liquid substances.

Yet another object of the present invention is to provide an automated system for dispensing substances in an animal housing facility which can access all the animal containment devices in the animal housing facility without preventing access to the animals and to the relative containment devices by the operator for other operations he must perform.

The object of the present invention is also to provide an automated system for dispensing substances in an animal housing facility that avoids soiling the housing tanks with residual diet.

This aim, and yet others which will be more apparent below, are achieved by an automated system for dispensing substances to animal containment devices in an animal housing facility, which is characterized in that it comprises at least one dispenser for dispensing food. Said dispenser, being supported by moving and positioning means suitable to move it to correspond with each of said animal containment devices, also comprises means to transfer the substance to be dispensed from the dispenser to the animal containment device.

The system according to the present invention is also characterized in that said animal containment devices are arranged on a rack defining a plurality of superimposed rows of containment devices, and said moving and positioning means are capable of moving the dispenser along said rows according to a direction X substantially horizontal and parallel to said rows, and transversely to said rows according to a direction Y substantially vertical and perpendicular to the direction X.

Moreover, the objects of the present invention are achieved by a system for dispensing food comprising at least one dosing device or dispenser, in turn comprising means for dispensing a solid diet and, if necessary, means for dispensing a liquid diet and means for tilting said dispenser.

BRIEF DESCRIPTION OF THE DRAWINGS

Further characteristics and advantages of the present invention will be more apparent from the detailed description below, provided by way of non limiting example and illustrated in the accompanying figures, wherein.

DETAILED DESCRIPTION OF THE INVENTION

Figure 1:
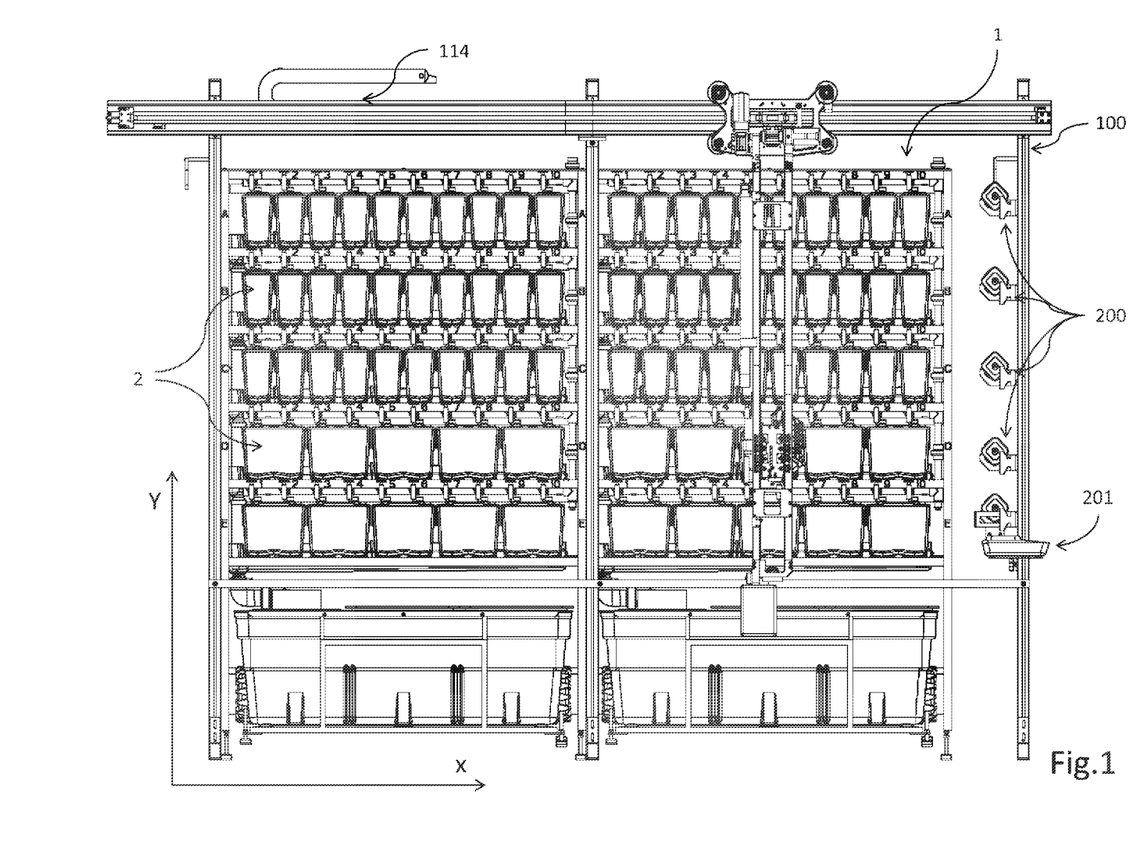
FIG. 1 shows a front assembly view of the system according to the present invention associated with a typical animal housing facility structure comprising 2 racks by way of example.

FIG. 1 shows an example of a typical animal housing facility rack suitable to house a plurality of laboratory animal containment devices (two structures by way of example).

In describing the preferred embodiment of the present invention, reference will be made to an animal housing facility in which said containment devices are tanks for housing aquatic organisms, or as they are called in more generic terms by researchers, aquatic animal models. In particular, FIGS. 1 to 8 show an embodiment of the system of the present invention suitable to be associated in particular with an animal housing facility for raising fish, preferably zebrafish, although without intending to limit the present invention to the dispensing of food or other substances to tanks for housing aquatic models. The animal containment devices of the animal housing facility can in fact be any, for example cages for guinea pigs, rats or other non-aquatic animals, or tanks for different aquatic animals.

This being stated, returning to FIG. 1, this shows a system 100 for the automatic dispensing of substances applied to rack 1 of an animal housing facility (2 racks by way of example) wherein animal containment devices 2 are arranged side by side. Again with reference to FIG. 1, the animal containment devices indicated generically with the reference number 2 are positioned side by side defining rows which identify a substantially horizontal direction indicated with X.

Rack 1 can be provided with a plurality of superimposed shelves so as to allow housing of several rows of containment devices 2, the rack therefore extends in height along the substantially vertical direction, indicated with Y.

Figure 2:
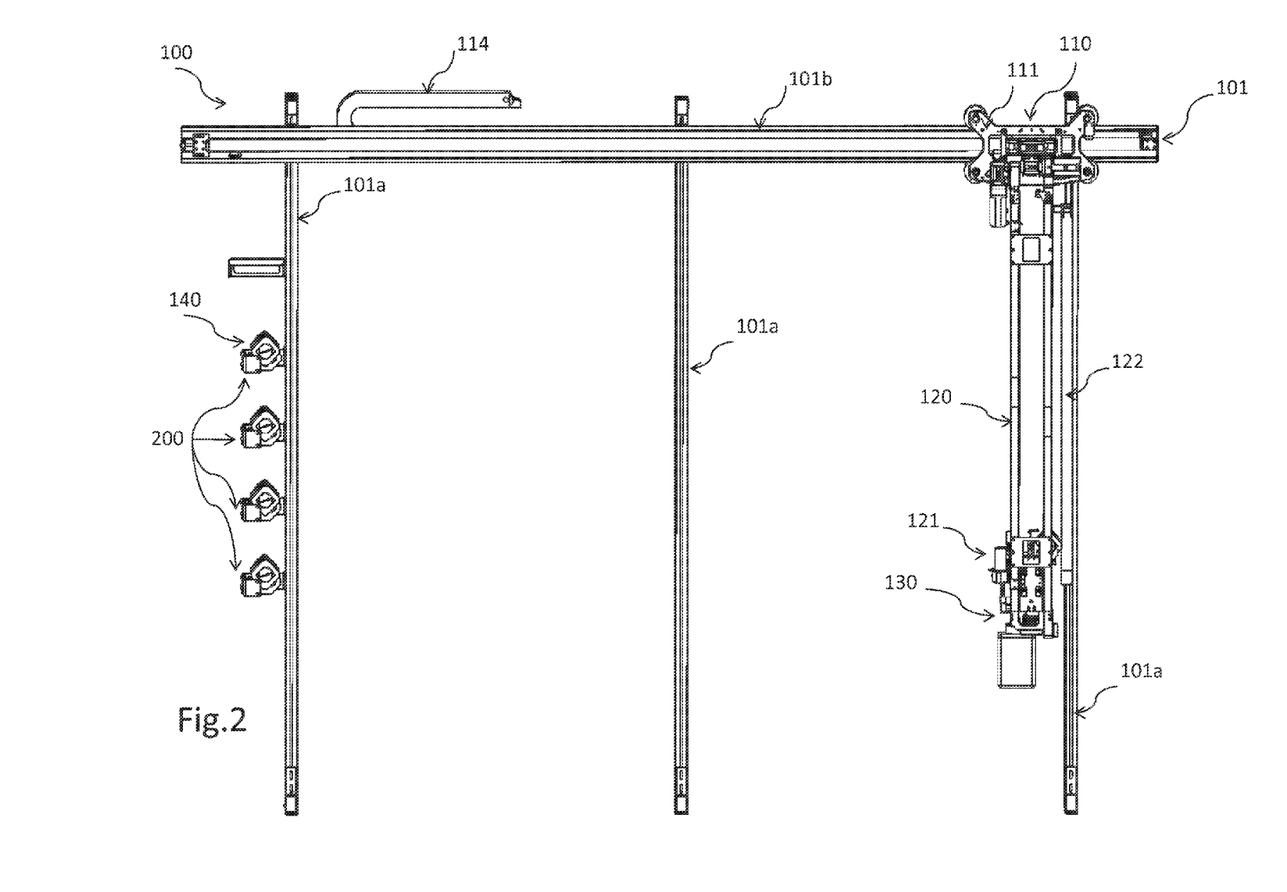
FIG. 2 shows a schematic front view of the automated distribution system according to the present invention.

As can be seen from FIG. 2, automated system 100 according to the present invention comprises movement, positioning and structural means 101, 101a, 101b, 110, 120, 121 suitable to move dosing device 130 so that it can be positioned to correspond with each containment device 2.

With reference to the embodiment shown in the figures, the movement and positioning means which are part of automated system 100 according to the present invention comprise truss 101 formed by one or more vertical beams or pillars 101a stably associated with at least one horizontal cross beam 101b. Truss 101 is therefore arranged so that vertical pillars 101a are substantially parallel to vertical direction Y while cross beam 101b is arranged along direction X, i.e., substantially horizontal and parallel to the rows of containment devices 2.

Truss 101 therefore realizes a system of Cartesian axes, which lie on a plane XY.

The movement and positioning means of dosing device 130 also comprise drive means 110 for moving the dispenser along direction X, and drive means 121 for moving the dispenser along direction Y.

Figure 3:
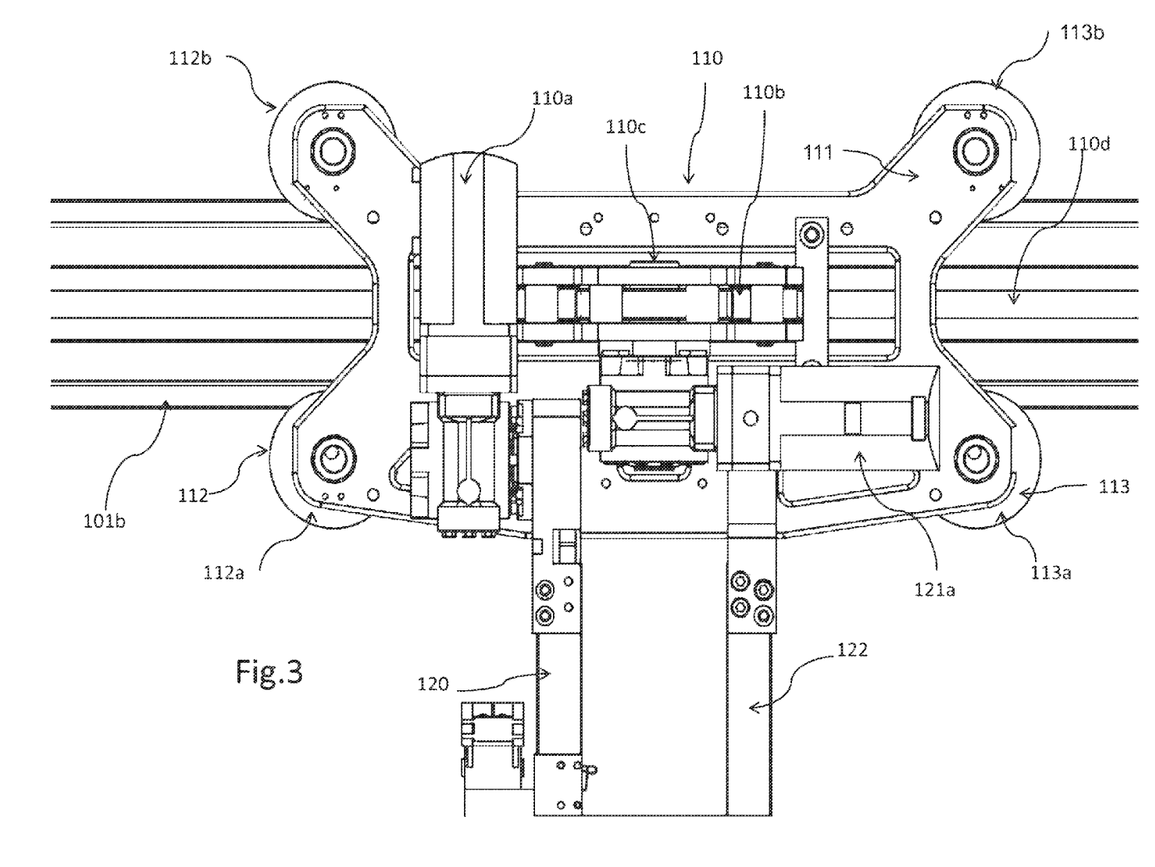
FIG. 3 shows a front view of a detail of the movement means and of the drive means of the automated system according to the present invention.

As shown in particular in FIG. 3, drive means 110 for moving dispenser 130 along direction X can advantageously comprise carriage 111 equipped with one or more pairs of opposed wheels 112 and 113 suitable to constrain carriage 111 to run along horizontal cross beam 101b. With particular reference to the detail of FIG. 3, pair of wheels 112 comprises wheel 112a placed against the lower surface of horizontal cross beam 101b and opposed wheel 112b which rests against the upper surface of cross beam 101b, and in the same manner pair 113 of opposed wheels comprises lower wheel 113a and upper wheel 113b, visible in detail in FIG. 3.

Carriage 111 is therefore capable of running with minimal friction along cross beam 101b, i.e., in the direction X.

In the embodiment, substantially vertical rod 120, thus arranged substantially parallel to direction Y, is solidly connected to carriage 111.

Rod 120, is composed of two mutually joined C-shaped drawn bars, and can thus move along direction Y together with carriage 111.

Dosing device 130 is slidingly associated with rod 120, so that the dosing device can run along the rod moved by suitable drive means 121. These drive means 121 can preferably comprise stepping motors 121a with encoders and built-in drive.

Advantageously, stepping motor 121 is connected directly to the movement system for the dosing device along axis Y, in the same manner described below for movement of carriage 111 in substantially horizontal direction X. In fact, for movement of carriage 111 along cross beam 101b motors of the latest generation of the same type, and a similar movement system can also be advantageously be provided, described below by way of example, without intending to limit the present invention to this particular technical solution.

Movement of carriage 111, which as stated translates along cross beam 101b, through the presence of wheels 112a and 113a and opposed wheels 112b and 113b, can advantageously be obtained through drive means 110, which in turn comprise stepping motor 110a which is connected directly to the toothed wheel motion transmission system indicated with 110c and visible in FIG. 3, allows movement of carriage 111 through interaction with belt 110d stably connected to horizontal or transverse rod 101b.

The solution consisting of the use of a belt along cross member 101b and belt-pulley coupling 110c to move carriage 111 allows a significant reduction in moving masses, also owing to the limited dimensions and weights of the motors used, thereby considerably reducing inertia.

Limitation of the forces of inertia allows motors of the latest generation mentioned above to be used. These motors are stepping motors which develop a maximum torque of 1 Newton/meter, and which can be controlled by digital signals. As stated, these motors comprise the control electronics required by the operator to programme the system, thus obtaining the further advantage of not having to provide a control panel to control movement of the system.

Dosing device 130 can thus run along rod 120 through drive means 121. In particular, with reference to FIG. 4, dosing device or dispenser 130 is supported by head 131. More in detail, dosing device 130 comprises container bottle 140 suitable to contain the substance, in particular, for example, a solid substance in the form of microgranules, which is pivoted to head 131 by means of pin 133 so that the bottle can rotate about said pin so as to be "tilted", or rotated about the fixed axis of pin 133 towards animal containment devices 2 when pushed, at the end opposite the pivoted end, by an appropriate crank arm indicated again in FIG. 4 with the reference number 132, also driven by electric motor 134.

Figure 4:
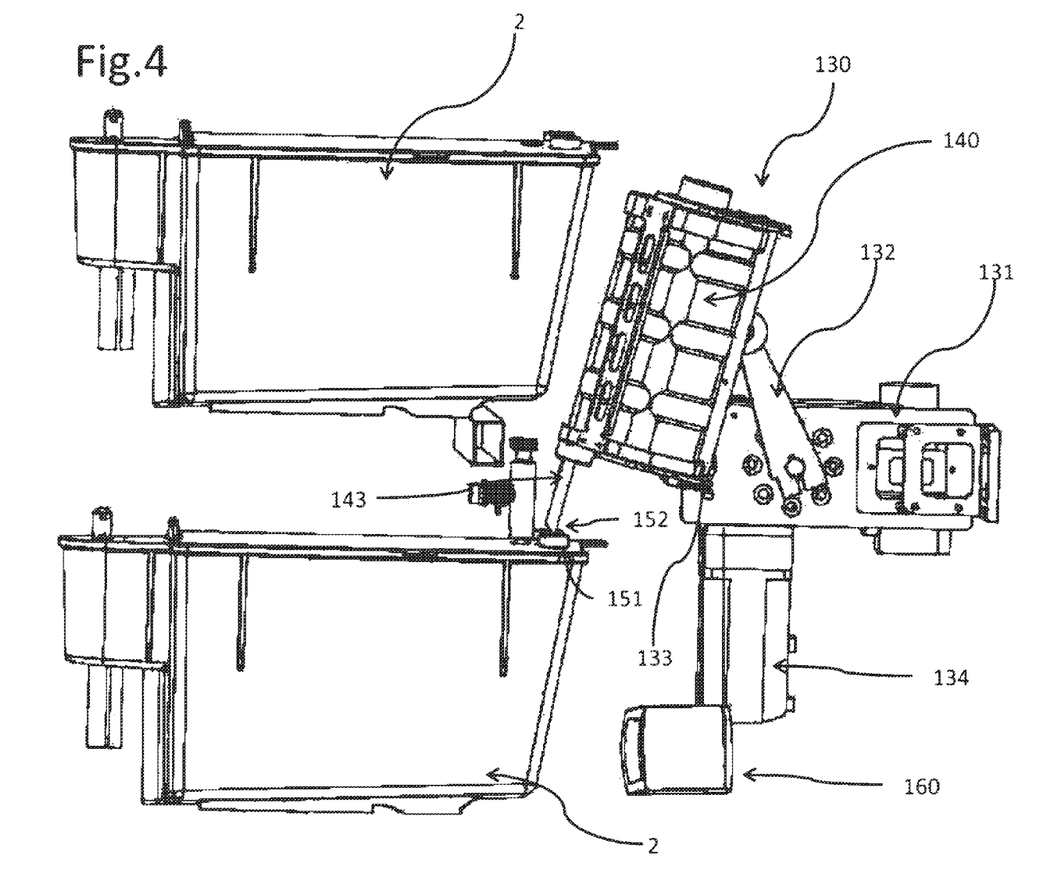
FIG. 4 shows, again in a schematic view, a detail of the tilting distribution device of the automated system according to the present invention, in an operating step to dispense a product.

Crank arm 132, pin 133 and motor 134 thus form the means for tilting the dosing device.

Through the tilting means described above, after the system has carried the dosing device to the desired position, corresponding with the animal containment device to which the substance is to be dispensed, container bottle 140 is carried, through the tilting operation, from a first substantially horizontal idle position to a second inclined or almost vertical position in which the substance contained in bottle 140 is dispensed, substantially falling through gravity, to the animal containment devices.

With reference to FIG. 4, it can be seen how said containment devices, indicated generically with the reference number 2, comprise one or more openings 151 and 152 arranged to dispense substances.

Dosing device or dispenser 130 comprises further elements.

With particular reference to FIGS. 4, 5a, 5b, 6 and 7, dispenser or dosing device 130 comprises, as stated, container bottle 140 inside which the substance to be dispensed can be placed, for example solid feed but also any similar diet normally in granular form.

First duct 141 for dosing solids is provided inside container bottle 140. This duct 141 advantageously extends longitudinally and is provided inside said container in a substantially axial position, and is provided with opening 142 in an appropriate point of the length thereof which allows entry of a predetermined quantity of the substance to be dispensed contained in container bottle 140.

Figure 6:
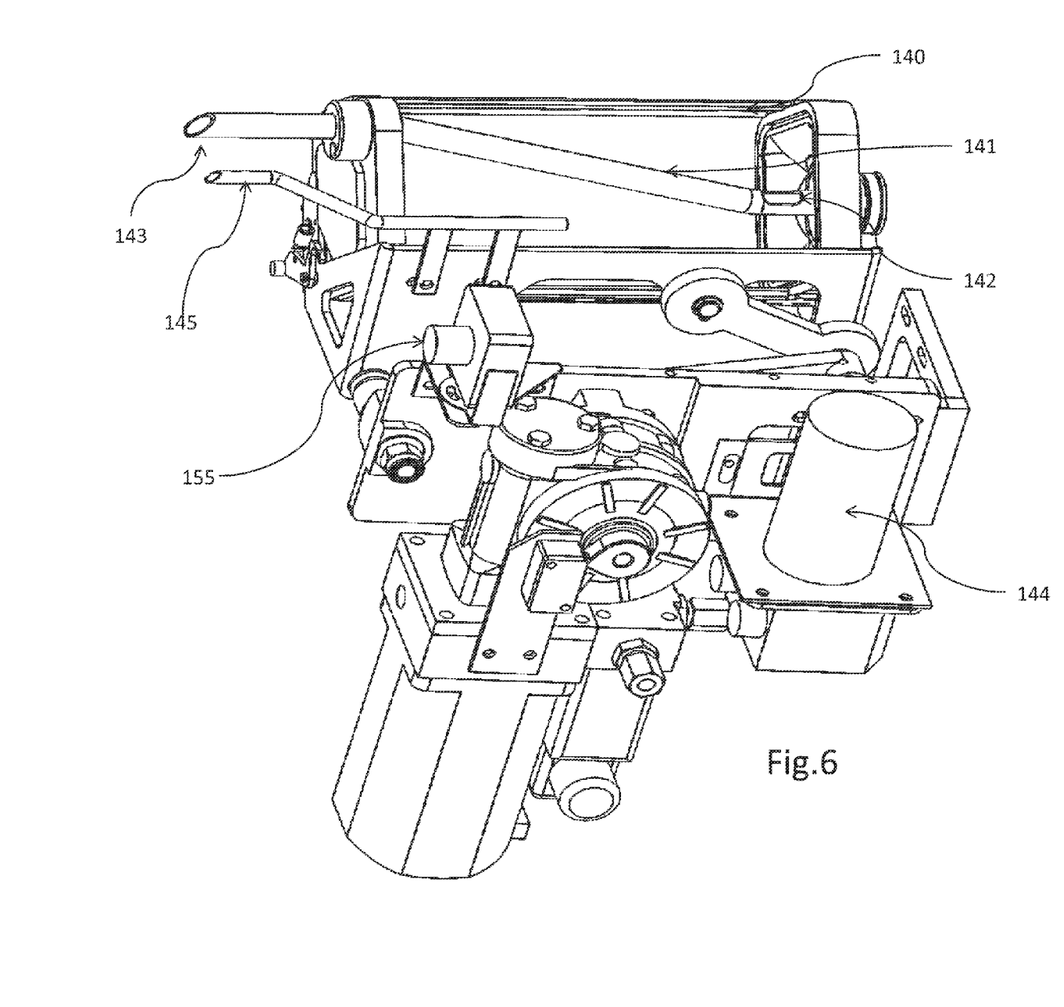
FIG. 6 shows a schematic view of the distribution device according to the present invention.
Figure 7:
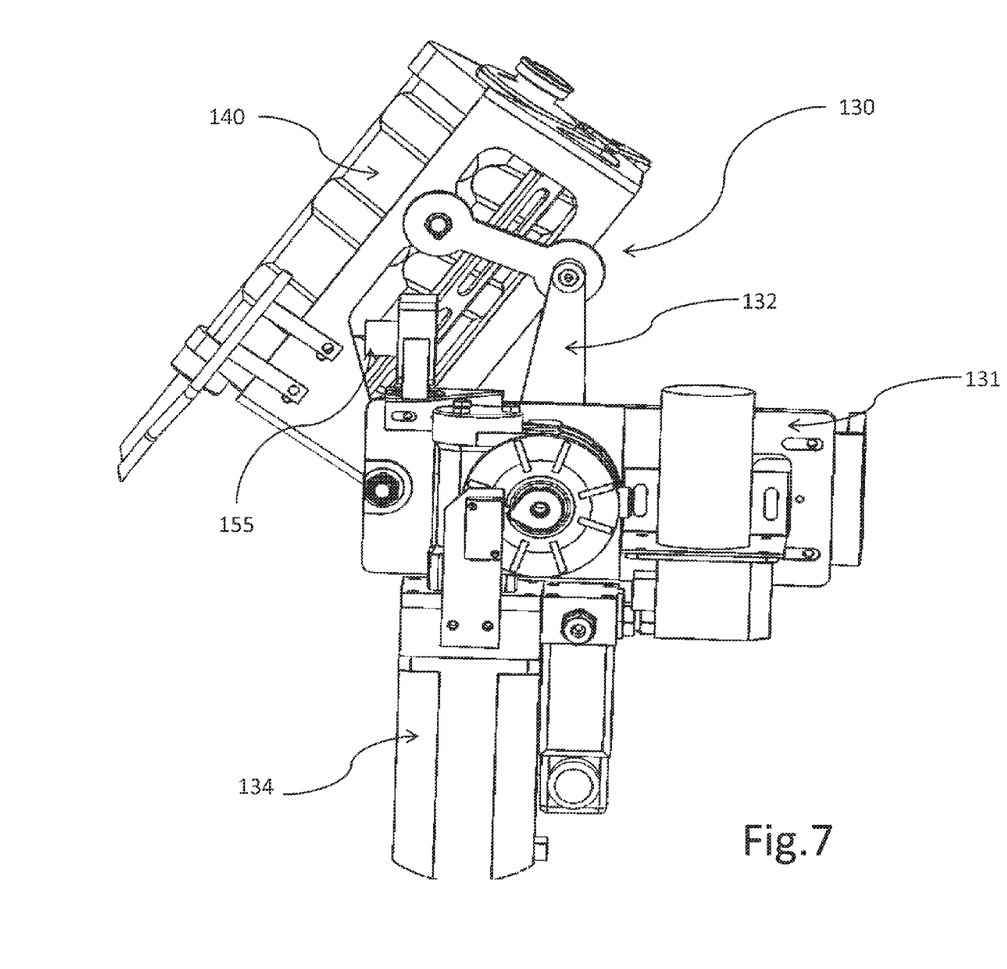
FIG. 7 again shows in a schematic view and during tilting the distribution device according to the present invention; and, FIG. 8 is a perspective view of the same movement and drive means of FIG. 3.
Figure 8:
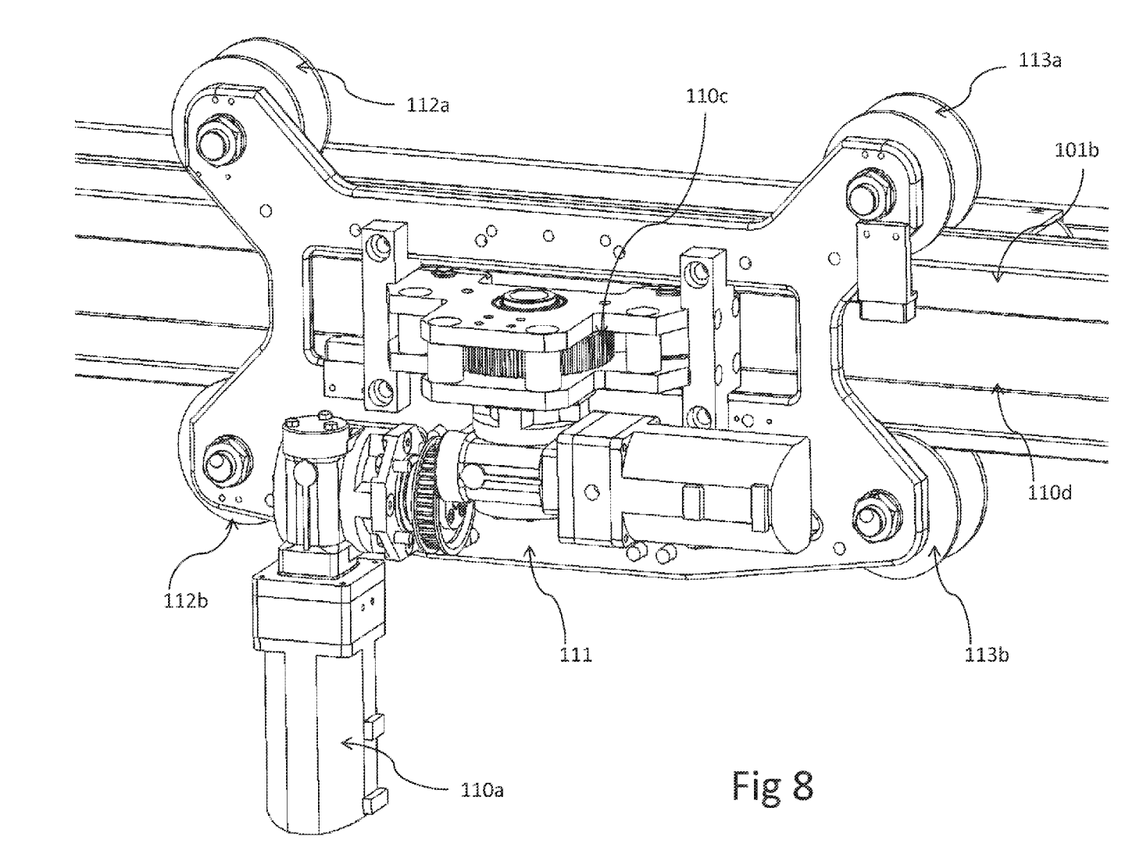

Advantageously, according to what is shown in the figures and in particular FIG. 6, this opening is placed along first duct 141 towards the end of duct 141 opposite the end for delivery of the dispensed substance, corresponding to spout 143 provided to insert the substance into opening 152 of the containment device 2.

The operating principle of dosing device 130 according to the present invention is as follows.

Container bottle 140 contains the substance, for example solid diet, to be dispensed to the containment devices 2.

When container bottle 140 is moved by the system it is in a first substantially horizontal idle position, as can be seen, for example, in FIG. 6. When the system positions dosing device 130 to correspond with the tank 2 into which it must be dispensed, through tilting means 132, 133, 134 of dosing device 130, or through crank arm 132 operated by electric motor 134, the dosing device rotates pivoting on pin 133 until it is the final position for dispensing of the substance, as can be seen in FIG. 4.

First duct 141 is provided with opening 142 which allows entry of a predetermined quantity of solid food. During tilting of container bottle 140 the substance to be dispensed enters duct 141 and the quantity of substance dispensed to the tanks depends on the dimensions of opening 142, on the dimensions of duct 141, on the tilting speed of container bottle 140, i.e., the acceleration imparted during the tilting step, and naturally on the time that the container bottle remains in the tilted position of FIG. 4. Through appropriate dimensioning of duct 141 and of opening 142, and through controlled tilting of the dispenser, it is possible to accurately dose a quantity of solid substance of a few milligrams. For example, for each animal the optimal dose, again in the case of the example in which the animals are aquatic animals, and in particular zebrafish, is of approximately 20 milligrams for each dose.

The dosing system is such as to allow variation of the dosage simply by varying the tilting speed. By varying the speed and/or acceleration of the steps to tilt bottle 140, it is possible to proportionally increase or decrease the quantity of solid substance dispensed.

The possibility of varying the quantity of solid substance dispensed by varying the tilting speed allows the further advantage of being able to dispense different quantities of the same product or the same quantity of products with different grain size with same dosing duct 141 for solid food and with same opening 142, without having to change the dispenser.

Again with reference to FIG. 4, in the case in which the animal containment device is composed of a tank to contain fish generically indicated with the reference number 2, this can advantageously be provided with one or more openings 151 and 152 for introducing food, depending on whether the tank has only one internal compartment or is provided internally with a bulkhead to divide the inner volume. In this case, dosing duct 141 for solid food can extend towards the outside of bottle 140 with spout 143 suitable to pour the solid substance into opening 151 or 152 without scattering the substance around the tank.

According to a preferred embodiment of the invention, dosing device or dispenser 130 can also comprise second duct 145 for dosing liquid substances, for example for dispensing a liquid diet. According to what is shown, for example, in FIG. 5b, duct 145 can advantageously be connected to a peristaltic dosing pump 144 for dispensing the liquid diet. With particular reference to FIG. 5b, the liquid diet dispensing system can also comprise liquid diet container 146.

Container 146 being connected through a first feed line "a" to the dosing pump 144 and through a second return line "c" to three-way solenoid valve 147.

Container 146 can advantageously be connected to rod 120 and be joined to peristaltic pump 144 and to three-way valve 147 by means of ducts of sufficient length that they do not obstruct the movement of dosing unit 130 in vertical direction Y. Advantageously, the ducts, not shown in the figures, can be housed inside flexible chain 122.

Three-way solenoid valve 147 is in turn connected to duct 145 for dispensing the liquid diet through a third feed line "d".

Dosing pump 144 is also connected to solenoid valve 147 by means of the feed line "b", so that operation of the system is as follows.

Solenoid valve 147 has the function of allowing pump 144 to maintain the substance or liquid solution in movement, so that no deposits of substances occur and therefore there is no deposit of solution on the bottom of the container. In fact, three-way valve 147 allows the solution contained in container 146 to remain constantly in circulation closing the feed line "d" and instead leaving the lines "a", "b" and "c" open. In this manner the solution contained in container 146 is moved by pump 144. The solution is sucked in through the line "a", reaches pump 144 which sends it to three-way solenoid valve 146 through the line "b", and returns to container 146 through the line "c".

When dispensing of the substance to the animal containment devices 2 is requested, a signal is sent by the control system to the solenoid valve which opens the line "d" joining solenoid valve 147 to dispensing duct 145.

The system thus conceived allows the liquid solution to be maintained continuously in movement, preventing deposits of material that would render the substance non-homogeneous, and at the same time allows dosing device 130 to dispense a solid diet or a liquid diet, as programmed by the researcher or laboratory technician.

Operation of the system for automatically dispensing substances 100 according to the present invention is as follows.

Through the movement and positioning means, in particular the truss 101 formed by vertical beams 101a and by at least one horizontal cross beam 101b, dosing device 130 can be positioned with precision in any point of the plane XY defined by the Cartesian axes X and Y corresponding to the directions determined by truss 101.

In particular, as stated the system can be provided with electric motors of the latest generation, equipped with encoders and built-in drive. These motors thus allow movement of the dosing device or dispenser 130 and can advantageously be controlled by a central programming unit (CPU), in turn connected to a handheld computer for programming the system, neither of which are represented in the figures.

Even more advantageously, according to a preferred alternative embodiment, the system can be programmed using a bar code reader. Labels with a bar code will be prepared ad hoc by the researcher or laboratory technician and affixed to each animal containment device indicated with the number 2. Each bar code will therefore be provided with indications relative and not limited to the position of the tank, identified through the coordinates X and Y, the number of animals contained in containment device 2, the age of the animals, the distribution times, the number of distributions and the type of substance, or diet to be dispensed. In this manner, the further advantage is obtained of eliminating possible programming errors by the operator who could erroneously indicate as present a tank removed previously by him or, unknown to him, by a co-worker. A data detection system is mounted in an appropriate position on part 130 of the present invention, preferably but not limited to bar code reader 160, represented in FIG. 4, which makes use of the movement along the axes X and Y to automatically read the information provided on the labels, preferably but not limited to a bar code, and consequently allows distribution of the correct type of diet at the predetermined times.

On the basis of a preferred embodiment, the system, according to the present invention, is provided with a hardware architecture that allows the electrical components to be mounted directly on the moving parts, with the exception of the power supply, so that no high voltage (220V -110V) is carried on the machine.

With reference to the figures, in particular to FIG. 2, the reference numbers 114 and 122 indicate the flexible cable chains that follow the motors, positioned on the moving bodies, respectively on carriage 111 and on drives 121 for movement of the dispenser along the substantially vertical direction Y. The power supply cable, the network cable and the access point are positioned inside the cable chains, thereby eliminating the presence of potentially dangerous external cables.

In addition to the parts described above, a video camera, indicated with the number 155 in FIGS. 5a, 5b, 6 and 7, can advantageously be housed directly on head 131 of dispenser 130 so as to remotely control correct operation, in particular correct positioning of the dispensing system.

Further, a weight detection system, indicated with number 201 in FIG. 1, can be built into the system, to check the presence and the quantity of substance to be dispensed present inside dispenser 130.

Moreover, although it has been shown how dispenser 130 according to the present invention has a dosing system capable of varying the quantity of substance, for example food, dispensed through programmed control of the tilting speed of the dispenser, and the type of substance, for example solid or liquid diet through the means for dispensing liquid diet, in the case in which it is necessary to dispense different substances to different animals, the system according to the present invention provides for the possibility of housing a plurality of container bottles 140 on specific shelves 200 which can advantageously be positioned at the side of the structure. See for example FIGS. 1 and 2. If, for example, it is necessary to dispense different diets to different animal containment tanks, with a simple operation it is possible to replace container bottle 140 already arranged on shelf 200.

In order for this operation, consisting of setting down the container bottle in use and picking up another one, also to be performed automatically, according to the system head 131 of dosing device 130 is also equipped with automatic coupling and release means 250 of container bottle 140.

Figure 5A:
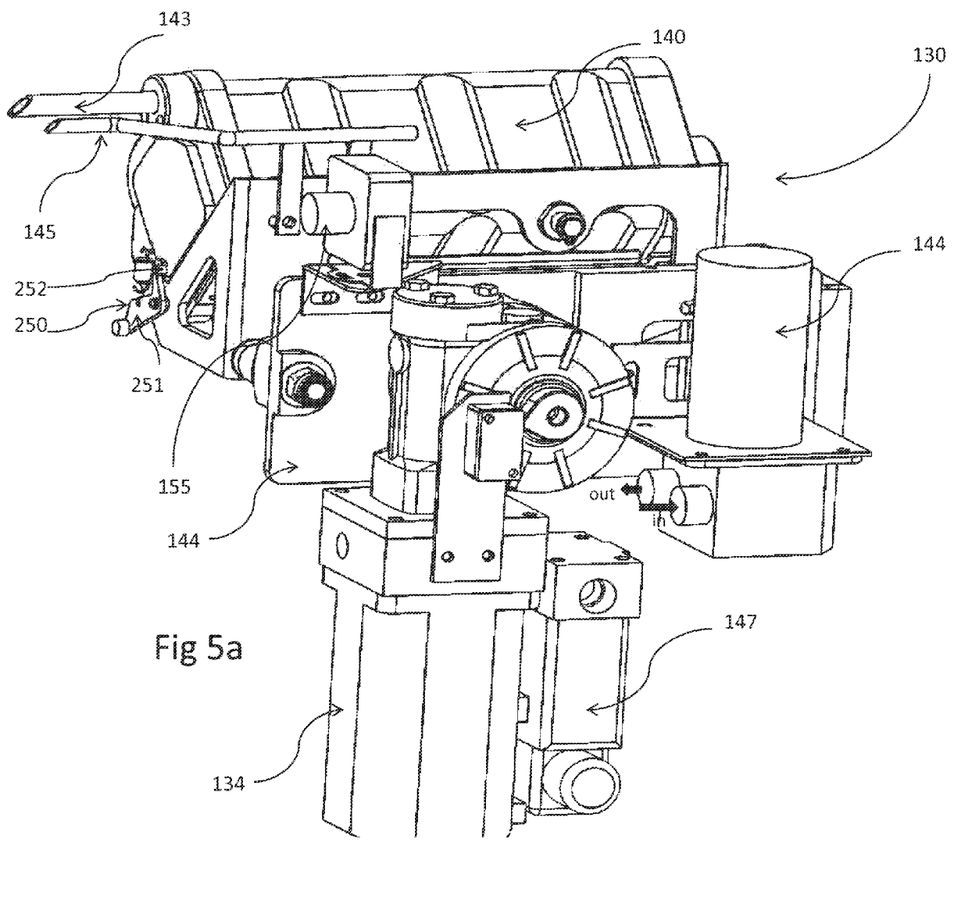
FIG. 5a shows a schematic view of a detail of the distribution device according to FIG. 4.
Figure 5B:
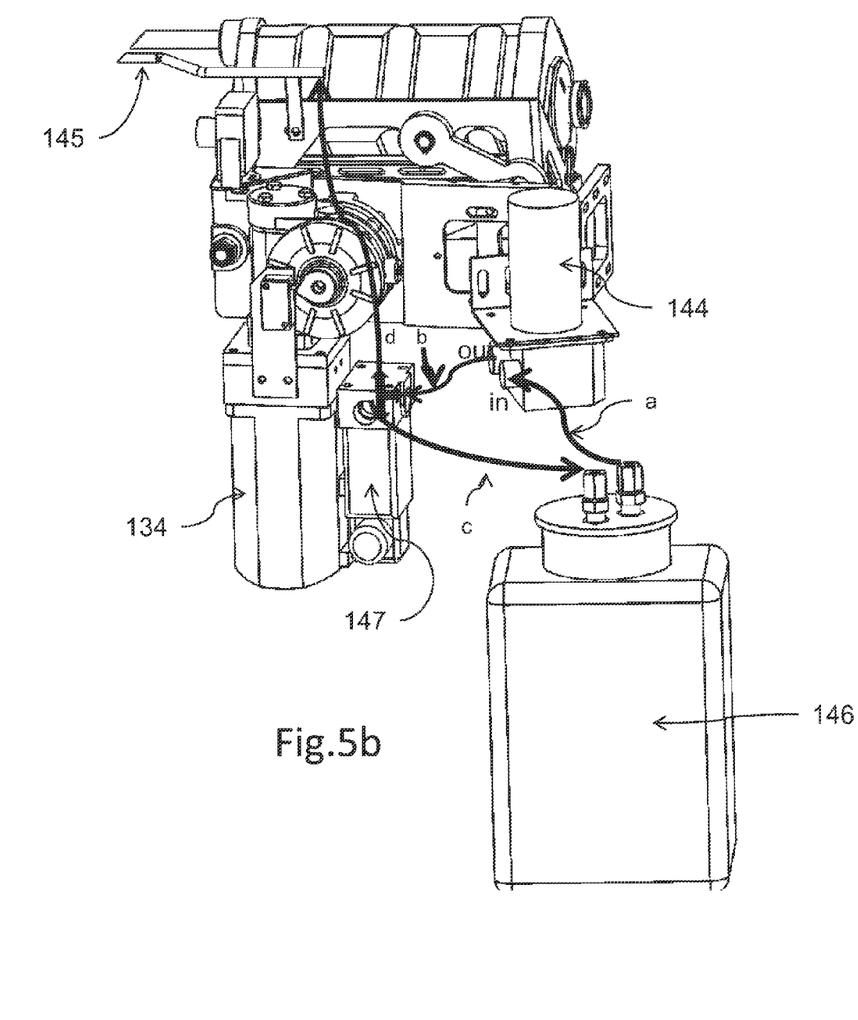
FIG. 5b again shows a schematic view of the distribution device of FIG. 4 in which further details are visible.

These means are represented schematically in FIG. 5a, where they are indicated with the reference number 250. They can be composed, for example, of hook 251 suitable to alternatively retain or release pin 252 solidly associated with container bottle 140.

In this manner, the system can also be programmed to dispense different substances, contained in the various bottles arranged on shelves 200.

Additionally, a load cell can also be provided on each shelf to detect the weight of the container bottle. Through detecting the weight before and after dispensing of the substance, the system can check whether the correct quantity of diet has been dispensed to the containment devices.

It has thus been shown how the automated system for distributing substances to animal containment devices in an animal housing facility achieves the object and the purposes proposed.

In particular, it has been shown how the system for distributing substances according to the present invention is capable of performing said distribution in an automated manner, thus eliminating the need for direct action by the operator, which translates into a considerable saving of time and costs.

Moreover, the automated system according to the present invention is capable of dispensing a controlled and predetermined quantity of a substance, liquid or solid, for example food, for each animal containment device in the animal housing facility. Also in the case of a plurality of containing devices, the system can be programmed automatically according to a predefined mapping, which associates a predetermined quantity of diet with each position of the dosing device corresponding to a specific animal containment device, and is even able to dispense a solid or liquid diet.

With the automated system according to the present invention it is also possible to solve the problem of compacting of solid feed deriving from the temperature and humidity conditions in the animal housing facility. In fact, it has been found that continuous movement of the solid feed contained in the dosing device as a result of tilting thereof during the dispensing operations allows the feed to be maintained constantly in optimal conditions, preventing compacting thereof.

It has also been shown how the automated system according to the present invention is capable of accessing all the animal containment devices of the animal housing facility without preventing access to the animals and containment devices by the operator for the other operations he requires to perform.

Moreover, with the present invention it is possible to overcome ergonomic and health hygiene limits which currently represent a serious problem.

Numerous modifications can be made by those skilled in the art without departing from the scope of protection of the present invention.

Therefore, the scope of protection of the claims must not be limited by the illustrations or by the preferred embodiments illustrated in the description by way of example, but rather the claims must include all those features of patentable novelty that reside in the present invention, including all those features that would be treated as equivalents by those skilled in the art.

What is claimed is:

1. An automated system for controlled distribution of substances to animal containment devices in an animal housing facility, comprising:
    at least one dispenser for distribution of liquid and/or solid substances, said at least one dispenser being supported by movement and positioning means which allow positioning thereof to correspond with each of said animal containment devices, and said dispenser comprising distribution and dosing means of the substances to be dispensed to the animal containment devices said movement and positioning means comprising appropriate drive means for movement of said at least one dispenser along at least two axes substantially mutually orthogonal defining a system of Cartesian axes, wherein said at least one dispenser comprises at least one container bottle suitable to contain the solid substance to be dispensed and in that said distribution and dosing means comprise means for tilting said container bottle.

2. The automated system recited in claim 1, wherein said at least one container bottle is pivoted in a point of a head that supports said at least one dispenser and in that said tilting means also comprise at least one crank arm driven by a motor and capable of causing tilting of said at least one container bottle about said point from a first substantially horizontal idle position to a second substantially vertical position in which the substance contained therein is dispensed.

3. The automated system recited in claim 1, wherein inside said at least one container bottle and said at least one dispenser comprises a first duct for dosing solid substances, provided in a point of the length thereof with an opening for controlled entry of the solid substance to be dispensed.

4. The automated system recited in claim 1, wherein said at least one dispenser also comprises means for dispensing liquid substances.

5. The automated system recited in claim 4, wherein said means for dispensing liquid substances comprise at least one container of liquid substance to be dispensed, at least one dosing pump and at least one three-way solenoid valve and in that said dosing pump and said container are connected in line selectively closed by said three-way solenoid valve so as to maintain the liquid substance in the container in continuous circulation.

6. The automated system recited in claim 1, wherein said movement and positioning means comprise at least one truss, in turn formed of one or more substantially vertical beams to which at least one substantially horizontal cross beam is connected, and in that said movement and positioning means comprise drive means for movement of said dispenser along the vertical and horizontal directions.

7. The automated system recited in claim 6, wherein said drive means for movement of said dispenser along the horizontal direction comprise at least one carriage equipped with a one or more pairs of opposed wheels suitable to constrain said carriage to run along said horizontal cross beam, said drive means also comprising at least one motor positioned on said at least one carriage and connected to a wheel interacting with a belt connected to said horizontal cross beam.

8. The automated system recited in claim 7, wherein said at least one carriage is solidly associated with a substantially vertical rod with which said dosing device is in turn slidingly associated, and in that said drive means for movement of said dispenser along the vertical direction comprise at least one motor connected to a pulley interacting with a belt solidly connected to said vertical rod.

* * * * *